March 17, 1942.  L. F. POOCK ET AL  2,276,627
MACHINE TOOL
Filed Oct. 21, 1939  3 Sheets-Sheet 1

Inventor
Louis F. Poock
Willis Fay Aller
Maréchal & Noé
Attorney

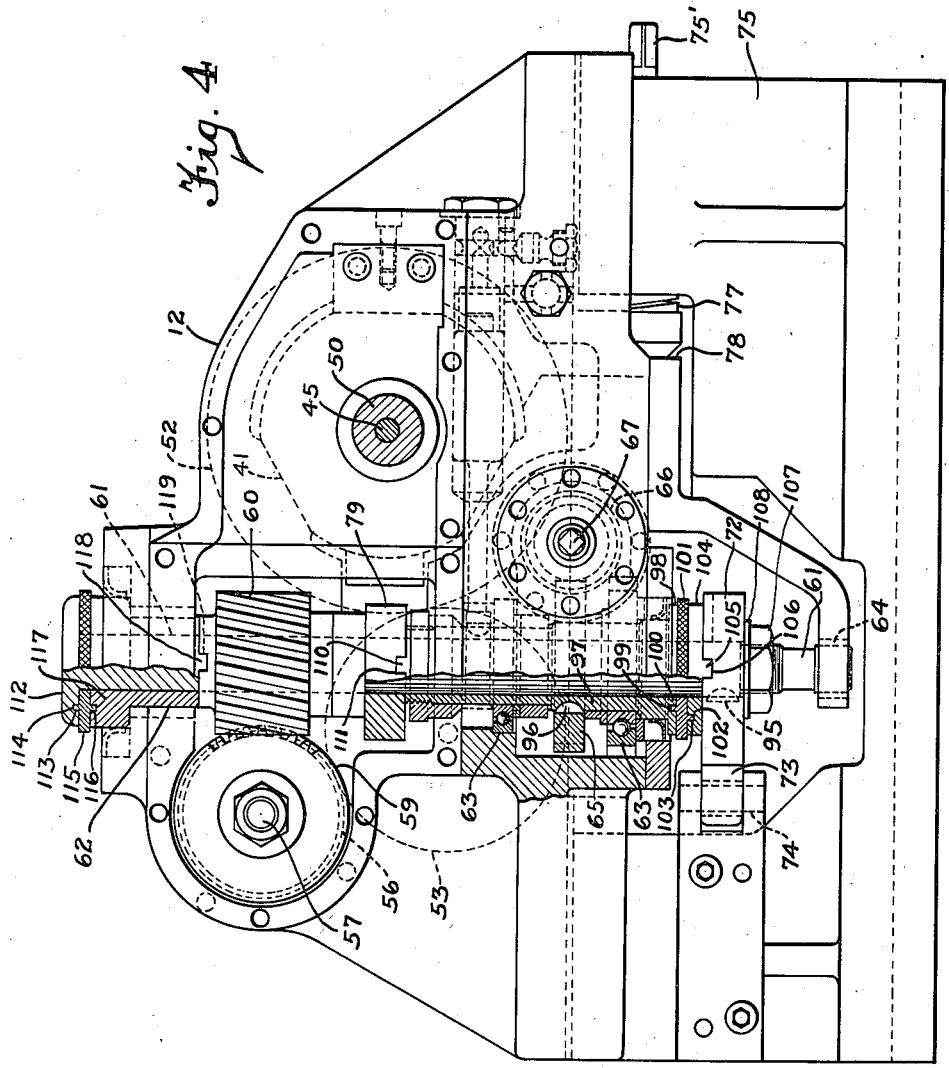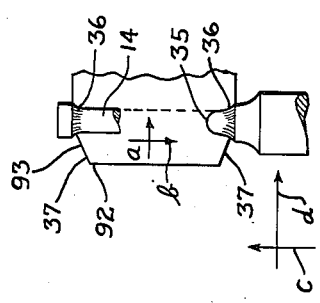

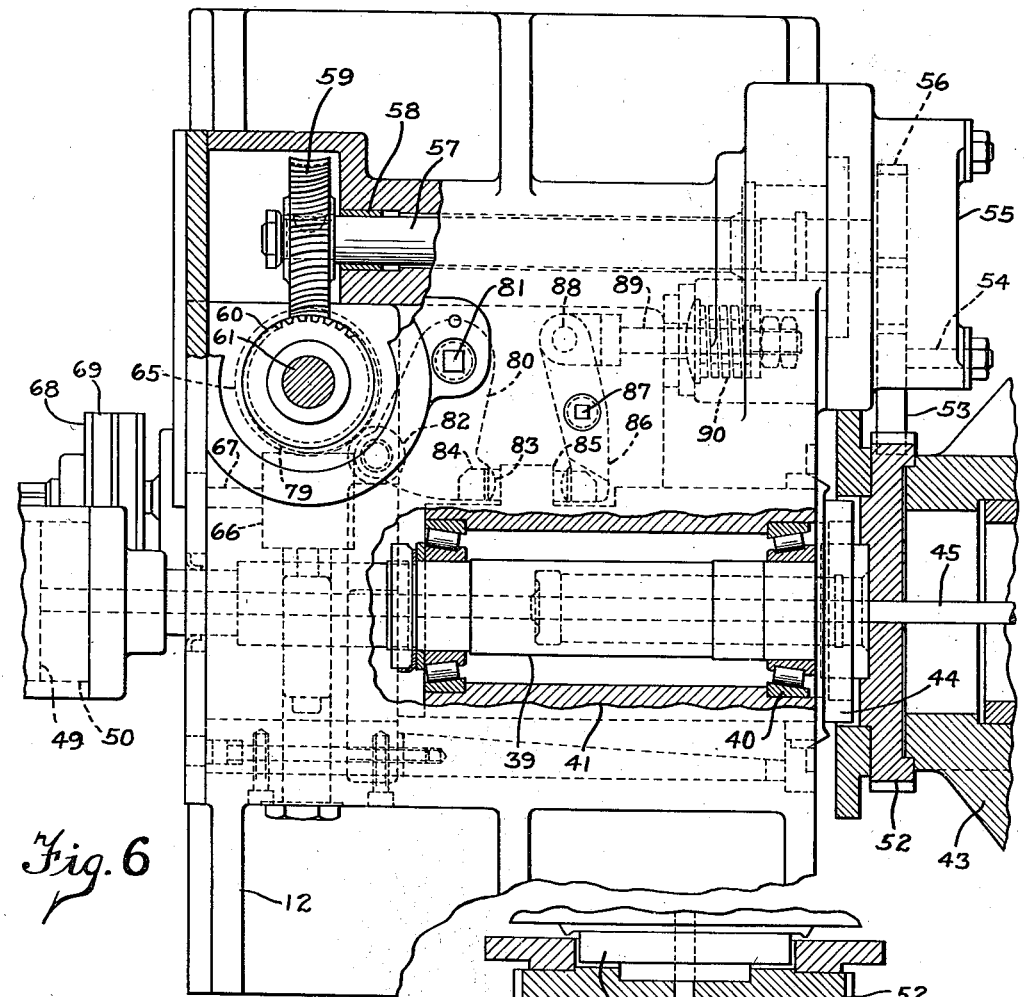
Fig. 6
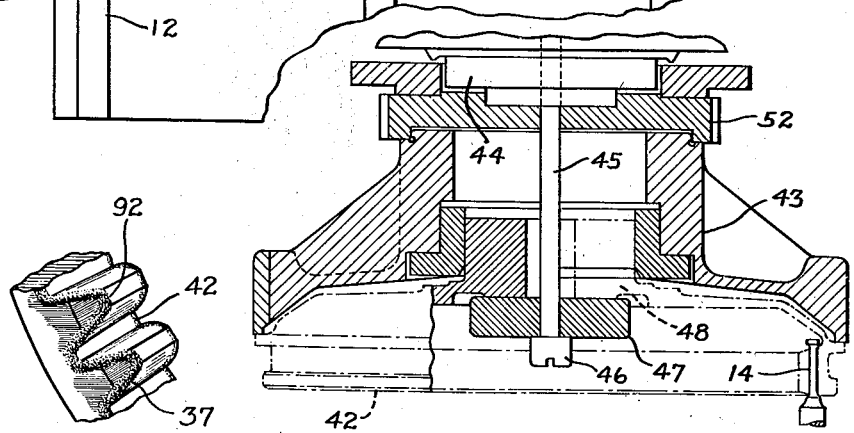
Fig. 8.
Fig. 7
Inventor
Louis F. Poock
Willis Fay Aller
Maréchal & Noe
Attorney

UNITED STATES PATENT OFFICE 2,276,627

MACHINE TOOL

Louis F. Poock and Willis Fay Aller, Dayton, Ohio, assignors, by mesne assignments, to The Sheffield Corporation, a corporation of Ohio Application October 21, 1939, Serial No. 300,650

13 Claims. (Cl. 90—1.4)

This invention relates to machine tools for operating on gears and the like.

One object of the invention is the provision of a machine adapted to shape or round the ends of gear teeth by means of a rotatable cutter and having provision for rotating the work piece on its axis and for additionally moving the work piece in accordance with its number of teeth so as to cause the edges of the teeth ends to move along the cutting zone.

Another object of the invention is the provision of a machine of the character mentioned in which the work piece is rotated at a uniform speed and is also moved in a direction perpendicular to its axis in timed relation to its rotational movements.

Another object of the invention is the provision of a machine tool for rounding the ends of gear teeth, in which a rotatable cutter is operated in an axial direction and then in a direction transversely of its axis to advance it to cutting position in engagement with the work piece, which is rotated and also moved bodily in a plurality of different directions.

Another object of the invention is the provision of a machine tool for shaping or rounding the ends of gear teeth of a work piece that is carried by a supporting member operable in several different directions by a plurality of driving members that are relatively adjustable so that the timing of each of the driving members may be readily changed with respect to others.

Other objects and advantages of the invention will be apparent from the following description, the appended claims and the accompanying drawings, in which:

Fig. 4 is an end elevation of the work supporting head, portions being shown in section for clearness of illustration;

Fig. 5 is a diagrammatic view showing the relation between the cutter and the gear tooth;

Fig. 6 is a top plan view of the work supporting head, with portions shown in section for clearness of illustration;

Fig. 7 is a horizontal sectional view taken centrally through a work piece and its holding means; and Fig. 8 is a perspective view of a fragment of the work after being finished in accordance with the present invention.

Figure 1:
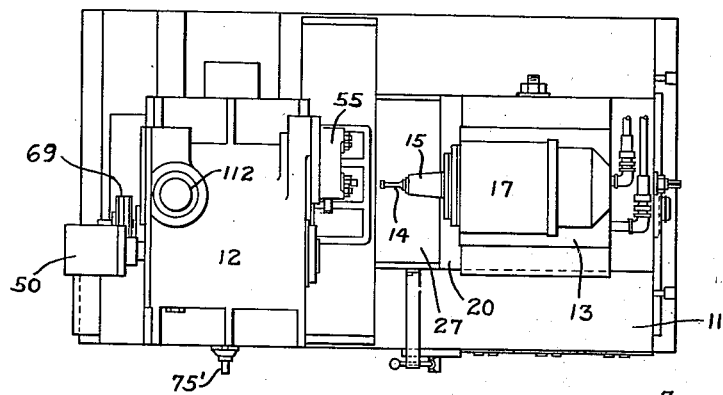
Fig. 1 is a top plan view of a machine embodying the present invention.

In the preferred embodiment of the invention which is illustrated in the drawings, it is shown as embodied in a machine adapted for shaping or rounding the lateral edges or ends of the teeth of gears and the like, so that sharp edges or corners at the ends of the teeth will be avoided. This is desirable for gears that are adapted to be moved into and out of mesh with other gears to facilitate the meshing engagement, and is also desirable, even if the gear always remains in mesh, as it increases the strength of the gear teeth by elimination of sharp edges, especially where the gear is heat treated.

Figure 2:
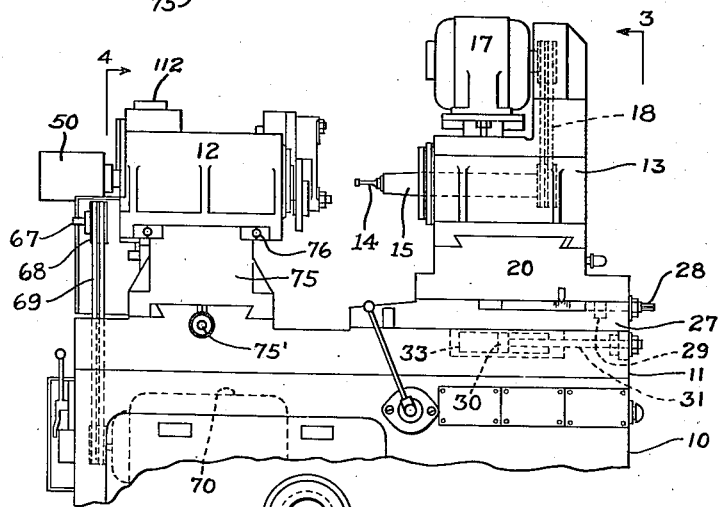
Fig. 2 is a front elevation of the upper portion of the machine.
Figure 3:
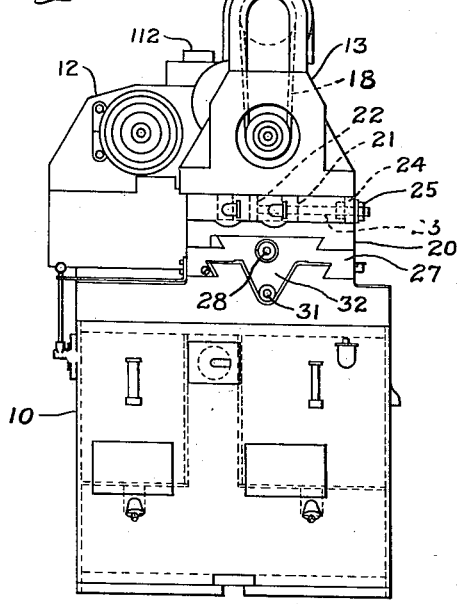
Fig. 3 is an end view of the machine.

Referring more particularly to the drawings by reference numerals, the machine as shown in Figs. 1, 2 and 3 comprises a main base structure 10 having a main bed member 11 carrying a work head 12 and a cutter head 13. The work head is adapted to carry and operate a work piece such as an internal or external gear or the like, while the cutter head carries a rotatable cutter 14 which is removably secured to a spindle 15 rotatably carried in the cutter head 13. An electric motor 17 mounted on the cutter head operates the spindle 15 through a suitable transmission belt 18 or the like.

The cutter supporting spindle 15 is held against axial movement in the head 13, and the latter is slidably supported on a table 20 for movement in a horizontal direction, transverse of the axis of rotation of the cutter. This movement may be effected by hydraulic control devices controlling the supply of fluid pressure to a cylinder 21 containing a piston 22 which is connected by piston rod 23 to a downwardly projecting tongue portion 24 on the head 13. The cylinder 21 is fixed to the table 20, and by suitably controlling the pressure at opposite sides of the piston 22 the cutter head may be moved horizontally on the table 20 to advance it to cutting position, determined by a stop which limits the movement of the piston in the cylinder. The piston rod 23 may be adjusted with respect to the tongue portion 24 of the support 13 and held in its adjusted position by lock nut 25, the rod being so fastened to the support 13 as to bring the tool into its proper cutting position when the movement of the piston is stopped by the end of the cylinder or by some suitable other positive stop.

The table 20 is slidably mounted on a plate 27 for movement in a direction parallel to the axis of spindle 15, for relative adjustment of the table 20 with respect to the plate 27. This adjustment may be effected by turning shaft 28 which is threaded in a lug 29 on the table 20 and which is rotatably mounted in the plate 27. The plate 27 is slidably mounted on the bed 11, under the control of hydraulic means, so that the table, together with the head 13, may be moved in the direction of the cutter axis to bring the cutter edges into a predetermined cutting plane. This movement of the plate 27 is effected by a piston and cylinder construction including a piston 30 fixed to a piston rod 31 which is secured to a downwardly projecting end portion 32 of the plate 27. The piston operates in a cylinder 33 fixed to the bed 11. When fluid is supplied to the right-hand side of the piston, as viewed in Fig. 2, it will be apparent that the plate 27 will be moved to the left, thus advancing the cutter in the direction of the cutter axis into a predetermined position. This movement is followed by the horizontal movement of the head 13 on the table 20 to move the cutter in a direction transverse of the cutter axis.

The cutter which is employed to shape or round the lateral edges of the teeth of an internal gear, on the side of the gear which is most remote from the cutter spindle, is shown at 14 in Fig. 5, while the cutter that is used on the side of the gear adjacent the cutter spindle is indicated at 35, it being understood that after cutting all the edges of the teeth at one side of the gear, as by cutter 14 for example, this cutter is removed from the cutter spindle 15 and replaced by the cutter 35 which then finishes the lateral edges at the ends of the teeth which are adjacent the cutter spindle. Each cutter is provided with a series of milling edges which are curved or rounded as indicated at 36 so that they will produce a smooth curving or rounding of the ends of the teeth as the gear is rotated and reciprocated in such a way that the contour edges of the gear teeth will be moved along past the cutter as the cutter rotates. This movement of the work piece or gear, in accordance with the present invention, comprises a rotation of the work at a uniform speed about the work axis and a timed movement of the work in a direction perpendicular to the work axis, indicated by the arrow A in Fig. 5. There is also an additional movement of the work in the direction of the arrow B in Fig. 5, parallel to the work axis, in finishing a tooth having an inclined side 37 so that as the work rotates, the end of the tooth at the point where it is engaged by the cutter will be maintained in the cutting zone. The movement of the tool, to advance it into cutting position from a retracted position is shown by the arrows C and D. The first movement of the cutting tool is in the direction C, parallel to the cutter axis and this is followed by a horizontal movement transversely of the cutter axis to move the axis of the cutter down into the space between adjacent teeth and bring the curved edges 36 into their cutting position. These movements of the cutter are initiated by a suitable control handle and effected by any suitable automatic control device which first energizes the motor 17 and then sequentially moves the cutter head to properly position the cutter in cutting position. The same control handle is preferably used to control the energization of the driving motor which operates the work as will be presently described.

The work head 12 is provided with a rotatable work supporting spindle 39 which is mounted for rotation by means of suitable antifriction bearings 40 in a carriage 41 provided in the head 12. A work piece, such as the internal gear 42, is adapted to be clamped on a face plate 43 which is removably secured to an end plate 44 on the end of the spindle 39. The attachment, as shown, is effected by means of a clamp rod 45 which is adapted to be moved axially towards the left as viewed in Fig. 6 so as to hold the headed end 46 of the rod against a C-shaped retainer plate 47 which bears against the disk portion 48 of the work piece. The rim portion of the work piece is thus held against the outer end of the face plate 43 so that the work piece will be fixed to the spindle 39. The rod 45 is movable axially through the spindle 39 and is provided with a piston 49 operable in a cylinder 50 which is carried on the outer end of the spindle 39. By supplying fluid to the right-hand side of the piston 49, the rod 45 will be moved to clamping position. To unclamp the gear it is merely necessary to relieve the pressure on the right-hand side of the piston 49 and apply pressure to the other side, as by operating suitable control valves, so as to move the rod 45 to the right and the C-shaped plate 47 may then be taken off by moving it transversely of the rod axis, thus permitting the work to be freed from the spindle.

Fixed on the spindle, between the end plate 44 and the face plate 43, is a gear 52 which rotates the work about the work axis. The gear 52 meshes with an idler gear 53 carried on shaft 54 which is arranged in a supporting bracket or housing 55. Within the housing 55 is a drive gear 56 which meshes with and drives the idler gear 53. Gear 56 is fixed on a countershaft 57 rotatably supported in an upper portion of the head 12 in suitable bearing members 58. The shaft 57 is provided with a driving gear 59 which meshes with a gear 60 carried by a vertical shaft 61, see Figs. 4 and 6. The shaft 61, which is rotatably mounted in bearing members 62, 63 and 64 in the head 12, is provided with a gear 65, driven by gear 66 which is carried on a shaft 67 that projects out through the end wall of the head 12 and which is fixed to a pulley wheel 68, operated by transmission belt 69. The latter is driven by an electric motor 70 which is carried in the base portion of the machine.

As the work piece is rotated at a substantially uniform speed about its own axis by the means just described, the work head 12 is moved horizontally in a direction perpendicular to the work axis, in timed relation to the work rotation and in accordance with the number and size of the teeth on the gear being operated on. This transverse movement of the work head is effected by a cam 72 fixed on the vertical shaft 61 and engaging a roller 73 carried by shaft 74 which is mounted in a table 75 on which the work head 12 is slidably mounted as by means of the antifriction ways 76. A spring 77 bears at one end against the table 75 and at its other end against a pressure member 78 on the head 12 and serves to maintain the cam 72 in pressure engagement with the roller 73. As the cam 72 is rotated, in timed relation to the rotational movements of the gear about its own axis, it will be apparent that the entire work head 12 is reciprocated back and forth with table 75, in a direction transverse of the work axis, and transverse of the cutter axis. The table 75 is manually adjustable transversely of the bed 11 by turning an adjustment screw 75' so that the table is properly positioned for any particular size of gear to be operated on.

In finishing a gear in which the sides of the gear teeth are arranged entirely in a plane which is transverse of the gear axis, it would be unnecessary to move the gear in the direction of its own axis to finish the ends of the gear teeth. However in finishing a gear in which portions of the ends of the gear teeth lie in different planes, as shown in Fig. 5, the work is moved in the direction of its own axis so as to reciprocate it towards and from the cutter, in timed relation to its lateral reciprocatory movements and in accordance with the angularity of the sides of the gear teeth. This movement of the work, as will be apparent from Figs. 4 and 6, is accomplished by moving the spindle carriage 41 in the direction of the spindle axis by cam means on the shaft 61, carriage 41 being slidably guided for axial movement in the work head 12. The shaft 61 is provided with a cam 79, preferably arranged between the gears 60 and 65, and rotational movements of this cam operate a rock arm 80, pivoted on the work head at 81 and having a thrust roller 82 which engages the surface of the cam. The arm 80 has a thrust finger 83 operable in a socket portion of an abutment block 84 which is slidably carried on a lug 85 that projects laterally from the spindle carriage 41. On the opposite side of the lug 85 is another arm 86 pivoted at its fulcrum 87 and pivotally connected at 88 to a spring pressed rod 89. The pressure of the spring 90 yieldingly urges the rod 89 toward the right as viewed in Fig. 6 and holds the arm 80 against the cam. The carriage 41 is thus moved in the direction of the work axis under the control of the cam 79 and the spring 90, and in accordance with the shape of the cam which has a throw equal to the distance between a transverse plane containing the end point 92 of the gear tooth and the transverse plane containing the end point 93, see Fig. 5. The movement of the work effected by the cam 79 is the one indicated by the arrow B of Fig. 5.

The various timing devices which control the operation of the work piece are compactly arranged on a common shaft, and are adapted to be readily removed and replaced so that gears having different number of teeth and different tooth shapes may be finished. And each of the timing devices that control the three different movements of the work supporting spindle is capable of being accurately set or positioned with respect to the others. As shown in Fig. 4, the cam 72 is keyed directly to the shaft 61 by a key 95. The gear 65 is secured as by means of a key 96 to a sleeve 97, the sleeve being the portion of the shaft which is rotatably mounted in the antifriction bearings 63. On the lower end of the sleeve 97 is a flange 98 having an annular series of sockets 99 any one of which may receive a pin 100 which is fixed on and projects upwardly from a disk 101. On the lower side of the disk 101 is another pin 102 which is adapted to be received in any one of an annular series of sockets 103 provided in a driving disk 104 which has a lug 105 received in a notch 106 in the cam 72. The position of the driving disk 104 is thus fixed with respect to the cam 72, but is rotatably adjustable with respect to the sleeve 97, the number of notches or sockets 99 in the flange 98 being one more than the number of notches 103 in disk 104 and providing a vernier adjustment which permits a relative setting of the cam with respect to the sleeve in any desired position. This adjustment may be accomplished by loosening the holding nut 107 which is threaded on the shaft 61 and which bears against a washer 108 at one side of the cam 72. When this nut 107 is backed off sufficiently, the sleeve 97 and the driving disk 104 may be separated in an axial direction far enough to separate the pins on disk 101 from the notches in which they are received and the disk 101 may then be turned and the proper rotational adjustment of the cam with respect to the sleeve obtained.

The sleeve 97 is provided with a tongue or projection 110 which enters a notch 111 in the cam 79. Since the sleeve is adjustable with respect to the cam 72, it will be apparent that rotational adjustment is provided in the relative setting of the cams 79 and 72. The upper end of the shaft 61 is integral with the top plate 112 which is provided with an annular series of notches or sockets 113 any one of which may receive the upwardly projecting pin 114 on a disk 115. This disk also has a downwardly projecting pin 116 which enters any one of a series of notches in a short sleeve 117 which is provided with a projection 118 entering and locking with a notch 119 provided in the gear 60. The gear 60 is rotatably adjustable on the shaft 61 but as will be apparent it is fixed to the short sleeve 117. The latter however is rotatably adjustable with respect to the shaft, when the holding nut 107 is loosened, by rotatably adjusting these two parts and entering the projecting pins on the upper and lower sides of the disk 115 with the proper notches in the top plate 112 and in the upper end of the sleeve 117.

In adjusting the setting of the various cams it is preferred that the position of the cam 72 with respect to the gear 60 should first be determined, by backing off the nut 107 and rotatably adjusting the top plate 112 with respect to the sleeve 117, and when this adjustment is secured, the gear will be moved transversely of its own axis in proper timed relation to the rotation of the gear. The position of the sleeve 97 with respect to the shaft may then be determined to give the proper setting of the cam 79 in order that the gear will be moved back and forth in an axial direction in proper timed relationship to its rotational movements. The nut 107 is then tightened to hold all these parts in their proper timed relationship, it being noted that the nut 107 is readily accessible at the lower side of the head 12, while the adjustment provided at the upper end of the shaft 61 is readily accessible at the top of the machine. It should also be noted that when the nut 107 is backed off of the threads on the shaft 61 the latter may be pulled up to be withdrawn from the cams, the sleeve 97, and the gear 60 so that those parts may be readily replaced.

The curved formation produced on the ends of the gear teeth follows the entire side or contour edge of the gear, avoiding sharp edges and giving a smooth curvature throughout the entire end of the gear. The cutters as shown in Fig. 5 are adapted for cutting internal teeth, and the device has been shown in Figs. 6 and 7 for that purpose but it will be obvious that the cutters may be used for cutting external or spur gears merely by employing the proper form of holding means by which the work is secured to the spindle. The diameter of the gear 52 is chosen in accordance with the diameter of the gear to be operated on, and the size of the idler gear 53 is so chosen as to give a proper gear drive from the gear 56 to the gear 52.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine tool for rounding the ends of gear teeth comprising a rotatable cutter, a support, a work supporting spindle rotatably mounted in said support, means carried by said support for rotating the spindle at uniform speed, and means in driving connection with said first-named means for moving the spindle perpendicularly to its axis in timed relation to its rotational movements.

2. A machine tool for rounding the ends of gear teeth comprising a rotatable cutter, a housing, a work supporting spindle having its axis parallel to the axis of the cutter and rotatably mounted in said housing, means in said housing for rotating the spindle, and means in said housing in driving connection with said first-named means for moving the housing perpendicularly to its spindle axis in timed relation to the rotational movements of the spindle.

3. A machine tool for rounding the ends of gear teeth comprising a rotatable cutter, means operable to advance the cutter to cutting position, a work supporting spindle, a housing rotatably mounting said spindle, means rotatably mounted in said housing for rotating the spindle, means in driving connection with said last-named means and arranged in said housing for moving the spindle axially in said housing in timed relation to its rotational movements, and means in driving connection with said spindle rotating means for moving the spindle perpendicularly to its axis in timed relation to its rotational movements.

4. A machine tool for rounding the ends of gear teeth comprising a rotatable cutter, means operable to advance the cutter to cutting position, a work supporting spindle having its axis parallel to the axis of rotation of the cutter, means for rotating the spindle, cam means for moving the spindle axially in timed relation to its rotational movements, and cam means for moving the spindle perpendicularly to its axis in timed relation to its rotational movements.

5. A machine tool for rounding the ends of gear teeth comprising a rotatable cutter, means operable to advance the cutter axially and then transversely of its axis to cutting position, a work supporting spindle having its axis parallel to the axis of rotation of the cutter, means for rotating the spindle at uniform speed, means for moving the spindle axially in timed relation to its rotational movements, and means for moving the spindle perpendicularly to its axis in timed relation to its rotational movements.

6. A machine tool for rounding the ends of gear teeth comprising a rotatable cutter, means operable to advance the cutter to cutting position, a work supporting spindle, means for rotating the spindle at a uniform speed, means for moving the spindle axially in accordance with the number of teeth on the gear being cut, means for moving the spindle perpendicularly to its axis in accordance with the number of teeth being cut, and a common drive for said rotating and moving means.

7. A machine tool for rounding the ends of gear teeth comprising a rotatable cutter, means operable to advance the cutter axially, means for moving the cutter transversely of its axis, a supporting spindle adapted to carry a toothed work piece and having its axis parallel to the axis of the cutter, drive means for continuously rotating said spindle through at least one complete revolution, and means in driving connection with said drive means for moving the spindle in a plurality of directions at an angle to one another in timed relation to its rotational movements to move the contour edges of the gear teeth along the cutter.

8. A machine tool for rounding the ends of gear teeth comprising a rotatable cutter, means operable to move the cutter to cutting position, a work support, a driving shaft having a first driving member for rotating the work support at a uniform speed, a second driving member for moving the spindle axially in accordance with the number of teeth on the gear being cut, a third driving member for moving the spindle perpendicularly to its axis in accordance with the number of teeth being cut, and means for relatively adjusting the timing of each of said members with respect to the others.

9. A machine tool for rounding the ends of gear teeth comprising a rotatable cutter, means operable to move the cutter axially and then laterally to advance the cutter to cutting position, a work supporting spindle having its axis parallel to the cutter axis, a driving shaft having a first driving member for rotating the work support at a uniform speed, a second driving member including a rotatable cam for moving the spindle axially in accordance with the number of teeth on the gear being cut, a third driving member including a rotatable cam for moving the spindle perpendicularly to its axis in accordance with the number of teeth being cut, and means for relatively adjusting the timing of each of said members with respect to the others.

10. A machine tool for rounding the ends of an irregularly shaped workpiece comprising a rotatable cutter, a support, a work carrying spindle arranged in said support, drive means for relatively rotating said spindle with respect to the cutter about the axis of the spindle, means in driving connection with said drive means for relatively moving the spindle and cutter at an angle to the spindle axis in timed relation to the spindle rotation, and means in driving connection with said drive means for relatively moving the spindle and cutter in the direction of the spindle axis in timed relation to the spindle rotation.

11. A machine tool for rounding the ends of an irregularly shaped workpiece comprising a rotatable cutter, a support, a work carrying spindle rotatably mounted on said support, drive means for rotating said spindle, means in driving connection with said drive means for relatively moving the spindle and cutter at an angle to the spindle axis in timed relation to the spindle rotation, means in driving connection with said drive means for relatively moving the spindle and cutter in the direction of the spindle axis in timed relation to the spindle rotation, and mechanism for relatively adjusting the timing of each of said means with respect to the others.

12. A machine tool for rounding the ends of an irregularly shaped workpiece comprising a rotatable cutter, a support, a work carrying spindle rotatably mounted in said support, drive means for rotating said spindle at a uniform speed, means in driving connection with said drive means for relatively moving the spindle and cutter in a direction transverse of the spindle axis in timed relation to the spindle rotation, and means in driving connection with said drive means for relatively moving the spindle and cutter in the direction of the spindle axis in timed relation to the spindle rotation.

13. A machine tool for rounding the ends of gear teeth comprising a rotatable cutter, a support, a work carrying spindle rotatably mounted on said support, drive means for rotating said spindle, means in driving connection with said drive means for moving the spindle transversely of the spindle axis in timed relation to the spindle rotation and in accordance with the number of teeth being cut, and means in driving connection with said drive means for relatively moving the spindle and cutter in the direction of the spindle axis in timed relation to the spindle rotation and in accordance with the number of teeth being cut.

LOUIS F. POOCK.
WILLIS FAY ALLER.